United States Patent [19]
Yabusaki et al.

[11] Patent Number: 5,572,584
[45] Date of Patent: Nov. 5, 1996

[54] CONNECTION CONTROL METHOD FOR PERSONAL COMMUNICATIONS

[75] Inventors: Masami Yabusaki, Iruma; Shoichi Hirata, Tokrozawa; Yasuyuki Uchiyama, Chofu, all of Japan

[73] Assignee: NTT Mobile Communications Network Inc., Tokyo, Japan

[21] Appl. No.: 441,708

[22] Filed: May 15, 1995

Related U.S. Application Data

[62] Division of Ser. No. 182,355, Oct. 6, 1993, abandoned.

[30] Foreign Application Priority Data

Apr. 2, 1993 [JP] Japan ....................... 5-76746

[51] Int. Cl.⁶ .................................................. H04M 3/42
[52] U.S. Cl. ..................... 379/229; 379/211; 379/265; 379/142; 379/207; 379/216
[58] Field of Search .................................... 379/210, 211, 379/212, 201, 265, 142, 127, 216, 217, 207, 229

[56] References Cited

U.S. PATENT DOCUMENTS

| | | | |
|---|---|---|---|
| 4,720,848 | 1/1988 | Akiyama | 379/217 |
| 4,752,951 | 6/1988 | Konneker | 379/211 |
| 4,791,662 | 12/1988 | Ahnen et al. | 379/158 |
| 4,852,156 | 7/1989 | Shigenaga | 379/216 |
| 5,168,515 | 12/1992 | Gsechter et al. | 379/212 |
| 5,197,096 | 3/1993 | Sakuma et al. | 374/211 |

FOREIGN PATENT DOCUMENTS 0501513 9/1992 European Pat. Off. .
9006039 5/1990 WIPO .

OTHER PUBLICATIONS

"Congestion Control System" by F. Fumio, Pat. Abstr. of Japan, vol. 10, No. 24 (E-377), Jan. 30, 1986 (Abstract Only).

Primary Examiner—Ahmad F. Matar
Attorney, Agent, or Firm—Pollock, Vande Sande & Priddy

[57] ABSTRACT

A switching center 30 comprises a memory part M2, a memory part M3, and a memory part M4. The memory part M2 stores a terminating terminal number corresponding to and registered by each subscriber. The memory part M3 stores idle/busy information corresponding to each terminal. The memory part M4 stores idle/busy information corresponding to each subscriber. When a subscriber $11_1$ makes a call at a terminal $12_2$, the switching center 30 determines whether the idle/busy information for the subscriber $11_1$ stored in the memory part M4 is idle or busy. When the idle/memory information represents idle, the switching center 30 refers to the idle/busy information for the terminal $12_2$ stored in the memory part M3. When this idle/busy information represents idle, the switching center 30 reads out the terminal number of a terminating terminal of a terminating subscriber stored in the terminating terminal memory part M2 and performs an outgoing call connection process. At this point, the switching center 30 also sets the idle/busy information for the subscriber $11_1$ and the terminal $12_2$ to busy state. When the subscriber $11_1$ makes a call, while the terminating terminal $12_1$ is performing an incoming call connection process for the subscriber $11_1$, since the idle/busy information for the subscriber $11_1$ has been set to the busy state, even if the terminal $12_2$ is idle, the switching center 30 does not perform an outgoing call connection process for the subscriber $11_1$ at the terminal $12_2$.

10 Claims, 11 Drawing Sheets

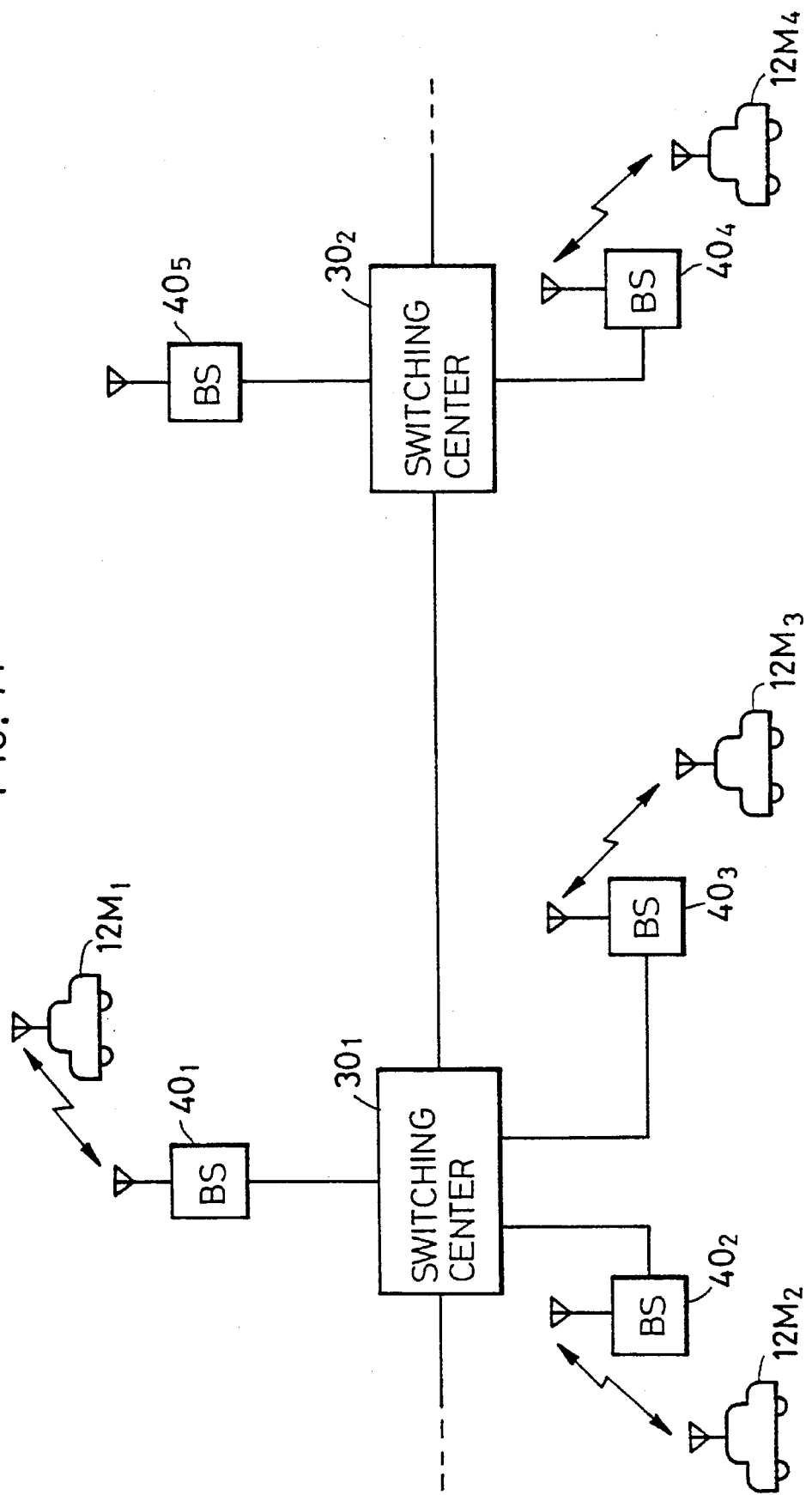

CONNECTION CONTROL METHOD FOR PERSONAL COMMUNICATIONS

This application is a divisional of U.S. patent application Ser. No. 08/132,355, filed Oct. 6, 1996 (now abandoned).

BACKGROUND OF THE INVENTION

The present invention relates to a connection control method for use in a personal communication system for allowing each subscriber thereof to make a call at any terminal to any designated terminal so as to provide advanced services.

FIG. 1 is a block diagram showing the construction of a conventional communication system. In a personal communication system, subscribers $11_1$, $11_2$, $11_3$, and so forth are designated by unique personal numbers (which are also denoted by $11_1$, $11_2$, $11_3$, and so forth). Each subscriber can make a call using any terminal $12_1$, $12_2$, $12_3$, and so forth (the terminal numbers thereof are also denoted by $12_1$, $12_2$, $12_3$, and so forth). When a subscriber registers a desired terminal as a terminating terminal to a switching center, he can receive incoming calls at the registered terminal. In an example shown in FIG. 1, the terminals $12_1$ to $12_4$ are accommodated in a switching center $30_1$. In the figure, a terminal $12_5$ is accommodated in a switching center $30_2$ which is connected to the switching center $30_1$. The switching center $30_1$ comprises a terminating terminal memory part M2 and a terminal idle/busy memory part M3. The terminating terminal memory part M2 stores terminating terminal numbers corresponding to personal numbers of the subscribers. The terminating terminal numbers are designated as terminating addresses by the subscribers. The terminal idle/busy memory part M3 stores idle/busy information which represents the idle state or busy state of each terminal depending on whether or not it is communicating (namely, performing an incoming/outgoing call connection process). When the connection process is started, the busy state is registered. On the other hand, when the communication session is completed, the idle state is registered.

Each subscriber can receive an incoming call at his registered terminal. On the other hand, each subscriber can make a call at any terminal regardless of whether it is his registered terminal. Unless otherwise specified, each subscriber does not have a so-called call waiting service where he can make a call at a terminal which is busy. In this example, terminating terminals of the subscribers $11_1$, $11_2$, $11_3$, and so forth are denoted by $12_1$, $12_2$, $12_3$, and so forth, respectively.

In a personal communication, when a subscriber makes a call, he inputs into a terminal both his personal number and a terminating personal number or a terminating terminal number. Thus, an outgoing call connection request takes place. The terminal sends this request to the switching center connected thereto. The switching center interrogates a service class of the subscriber corresponding to the received originating personal number from a subscriber service memory part M1. (The term "interrogate" means, throughout this specification, "retrieve and read out".) Thereafter, the switching center starts an outgoing call connection process corresponding to the service class. For example, when the subscriber $11_1$ makes a call at the terminal $12_2$, the switching center $30_1$ refers to the idle/busy information for the terminal $12_2$ stored in the terminal idle/busy memory part M3. When the idle/busy information represents an idle state, the switching center $30_1$ performs the outgoing call connection process. Since the terminal $12_2$ is a terminating terminal of the subscriber $11_2$, if the switching center $30_1$ is performing a terminating call process to the subscriber $11_2$ and therefore his idle/busy state is busy when the subscriber $11_1$ makes a call at the terminal $12_2$, the switching center $30_1$ does not perform the originating process for the subscriber $11_1$.

When a call is terminated to the subscriber $11_1$, the switching center $30_1$ refers to the idle/busy information for the terminal $12_1$ stored in the terminal idle/busy memory part M3 corresponding to the terminal number of the terminating terminal $12_1$ of the subscriber $11_1$ stored in the terminating terminal memory part M2. When the idle/busy information represents an idle state, the switching center $30_1$ causes the call connection control part 31 to connect the call to the terminal $12_1$. At this point, if the subscriber $11_2$ is communicating at the terminal $12_1$, since the idle/busy information for the terminating terminal $12_1$ of the subscriber $11_1$ represents a busy state, the switching center $30_1$ does not perform the outgoing call connection process.

Since each subscriber cannot make calls, simultaneously, at a plurality of terminals disposed at different locations, a service which simultaneously processes a plurality of communication requests for one subscriber should be normally restricted. In the prior art, the switching center only stores the idle/busy information for terminals. Thus, while the subscriber $11_1$ is communicating at the terminal $12_2$, if there is an incoming call to the subscriber $11_1$, the switching center $30_1$ connects the incoming call to the registered terminal $12_1$ of the subscriber $11_1$ when the terminal $12_1$ is idle. Thus, the condition that the same subscriber is communicating at a plurality of terminals, simultaneously, is caused, which gives rise to a problem of providing double calls to the same contracted personal number.

Now assume that the subscribers $11_1$, $11_2$, etc. have a call waiting service. In this condition, if there is a new incoming call to a subscriber who is already communicating (as a first communication), the subscriber can receive the second communication while suspending the first communication. For example, when the subscriber $11_3$ inputs the personal number of the subscriber $11_1$ at the terminal $12_3$, an outgoing call connection request takes place. At this point, the switching center $30_1$ refers to the terminal idle/busy memory part M3 corresponding to the terminal number $12_1$ of the terminating terminal $12_1$ registered by the subscriber $11_1$ and stored in the terminating terminal memory part M2. If the terminal $12_1$ is idle, the switching center $30_1$ causes the call connection control part 31 to connect the incoming call to the terminal $12_1$. When the subscriber $11_1$ replies to the incoming call at the terminal $12_1$, the first communication is established.

Next, during the first communication, when a subscriber $11_4$ inputs the personal number of the subscriber $11_1$ at a terminal $12_4$, a connection request takes place. At this point, the switching center $30_1$ interrogates the terminal number $12_1$ of the terminating terminal $12_1$ registered by the subscriber $11_1$ and stored in the terminating terminal memory part M2 and causes the call connection control part 31 to connect the incoming call to the terminal $12_1$. By suspending the first communication at the terminal $12_1$, the subscriber $11_1$ can receive the second communication which is the incoming call from the subscriber $11_4$. In addition, the subscriber $11_1$ can suspend the second communication so as to restore the first communication.

In the above-described prior art, let it be supposed that the subscriber $11_1$ dialed the personal number of a subscriber $11_3$ at a terminal $12_2$ other than his terminating terminal $12_1$ which has been in a first communication with the subscriber $11_3$. At this point, if the subscriber $11_4$ originates a call for communication with the subscriber $11_1$ at the terminal $12_4$, the call to the subscriber $11_3$ would be connected to the terminating terminal $12_1$ as explained previously. Thus, the call is not received by the subscriber $11_1$ who is communicating at the terminal $12_2$. In other words, while a subscriber is communicating at a terminal other than his terminating terminal, he cannot have call waiting service. In addition, since the subscriber is communicating at a terminal other than his terminating terminal, the switching center eventually connects an incoming call to his registered terminal where he is absent.

In an integrated services digital network (ISDN) system, which is not necessarily a personal communication system, each terminating terminal has a display 12D as shown in FIG. 1. With the display 12D, a calling line identification service which displays the terminal number of an originating terminal is performed. In this system, each switching center 30 shown in FIG. 1 comprises, as shown in FIG. 2, a call connection control part 31, a terminal number sending/receiving part 34, a terminal number transmitting part 35, and a personal number receiving part 36. The call connection control part 31 controls line connections between the switching center and terminals or line connection with another switching center. The terminal number sending/receiving part 34 sends and receives terminal numbers to and from terminal $12_1$. The terminal number transmitting part 35 sends and receives a terminal number to and from another switching center. The personal number receiving part 36 receives personal numbers from terminals $12_j$.

When an originating subscriber $11_1$ makes a call at a terminal $12_1$, he inputs both his personal number and the terminal number of a terminating terminal (for example, the terminal number of a terminal $12_5$ as in FIG. 1). At this point, the originating terminal $12_1$ sends a SETUP message to the switching center $30_1$. The SETUP message serves to initiate the call and contains the terminal number of the terminating terminal, the personal number of the originating subscriber $11_1$, and the terminal number of the originating terminal $12_1$. Thus, the personal number receiving part 36 and the terminal number sending/receiving part 34 of the switching center $30_1$ receive the terminal number of the terminating terminal, the personal number of the originating subscriber $11_1$, and the terminal number of the originating terminal $12_1$. Thereafter, the switching center $30_1$ analyzes the terminal number of the terminating terminal. If the terminal number of the terminating terminal is not accommodated in the switching center $30_1$, the terminal number transmitting part 35 of the switching center $30_1$ transmits an IAM message to a switching center $30_2$ which accommodates the terminating terminal. The IAM message contains the terminal number of the originating terminal $12_1$, and the terminal number of the terminating terminal.

The switching center $30_2$ sends a SETUP message to the terminating terminal $12_5$. The SETUP message serves to call the terminating subscriber $11_5$ and contains the terminal number of the originating terminal $12_1$, and the terminal number of the terminating terminal. The terminating terminal $12_5$ displays the terminal number $12_1$ of the originating terminal $12_1$ on the display 12D. Thus, the terminating subscriber $11_5$ can guess from the originating terminal number $12_1$ on the display 12D who the originating subscriber $11_1$ could be and which company or location the terminated call could be originated from.

When a call is sent from a telephone with a representative telephone number of a company or the like, it is impossible for a terminating subscriber to know by whom of the company the call is sent. When a call is sent from a mobile telephone (such as a car telephone or a portable cellular phone), if the mobile telephone is shared by several people, it is impossible for a terminating subscriber to know by whom the call is sent. In the personal communication (personal number communication) system, each subscriber is given a unique personal number and any terminal can be registered as his terminating terminal. Even if the calling line identification service of the ISDN system is introduced to the personal communication system, the terminating subscriber cannot know the originating subscriber from the originating terminal number since each terminal can be used by any subscriber. Thus, even with the terminal number of an originating terminal displayed on the terminating terminal, the terminating subscriber cannot estimate the identify of the originating subscriber. In other words, although each subscriber is given a unique personal number, it cannot be effectively used.

SUMMARY OF THE INVENTION

An object of the present invention is to provide a connection control method for personal communications which solves the aforementioned problems.

In other words, a first object of the present invention is to provide a connection control method for a personal communication for preventing an incoming call from being connected to a subscriber while he is communicating at a terminal.

A second object of the present invention is to provide a connection control method for personal communications that allows a subscriber to receive an incoming call destined thereto while he is communicating at a terminal other than his registered terminal.

A third object of the present invention is to provide a connection control method for personal communications that allows a terminating subscriber to know a personal number of an originating subscriber.

According to a first aspect of the present invention, a subscriber idle/busy memory means is provided to store idle/busy information which represents idle or busy state depending on whether or not a subscriber is communicating (namely, he is making a call or receiving a call). When the subscriber makes a call or receives a call, the switching center refers to the idle/busy information for the subscriber from the subscriber idle/busy memory means. When the idle/busy information represents the idle state, the switching center refers to idle/busy information for the originating terminal or terminating terminal. When the idle/busy information represents the idle state, the switching center connects the call to the subscriber.

According to a second aspect of the present invention, while a subscriber is communicating, the switching center causes a communicating terminal memory means to store the personal number of the subscriber and the terminal number of a terminal at which the subscriber is communicating. When a second request for a call to the subscriber takes place while the subscriber is already communicating, the switching center connects the call to the communicating terminal corresponding to the communicating terminal number interrogated from the communicating terminal memory means.

According to a third aspect of the present invention, each switching center is provided with a personal number transmitting means. The personal number transmitting means sends and receives the personal number of each originating subscriber between each switching center so as to inform each terminating subscriber of the personal number of the originating subscriber. When a subscriber makes a call with his personal number, the originating terminal sends the personal number to the switching center. The switching center causes the personal number transmitting means to transmit the personal number of the originating subscriber received from the originating terminal to the terminating switching center. The terminating switching center informs the terminating terminal of the personal number of the originating subscriber.

BRIEF DESCRIPTION OF DRAWINGS

FIG. 11 is a block diagram showing a personal communication network for use in a mobile communication system according to the connecting method of the present invention.

DESCRIPTION OF PREFERRED EMBODIMENTS

Figure 1:
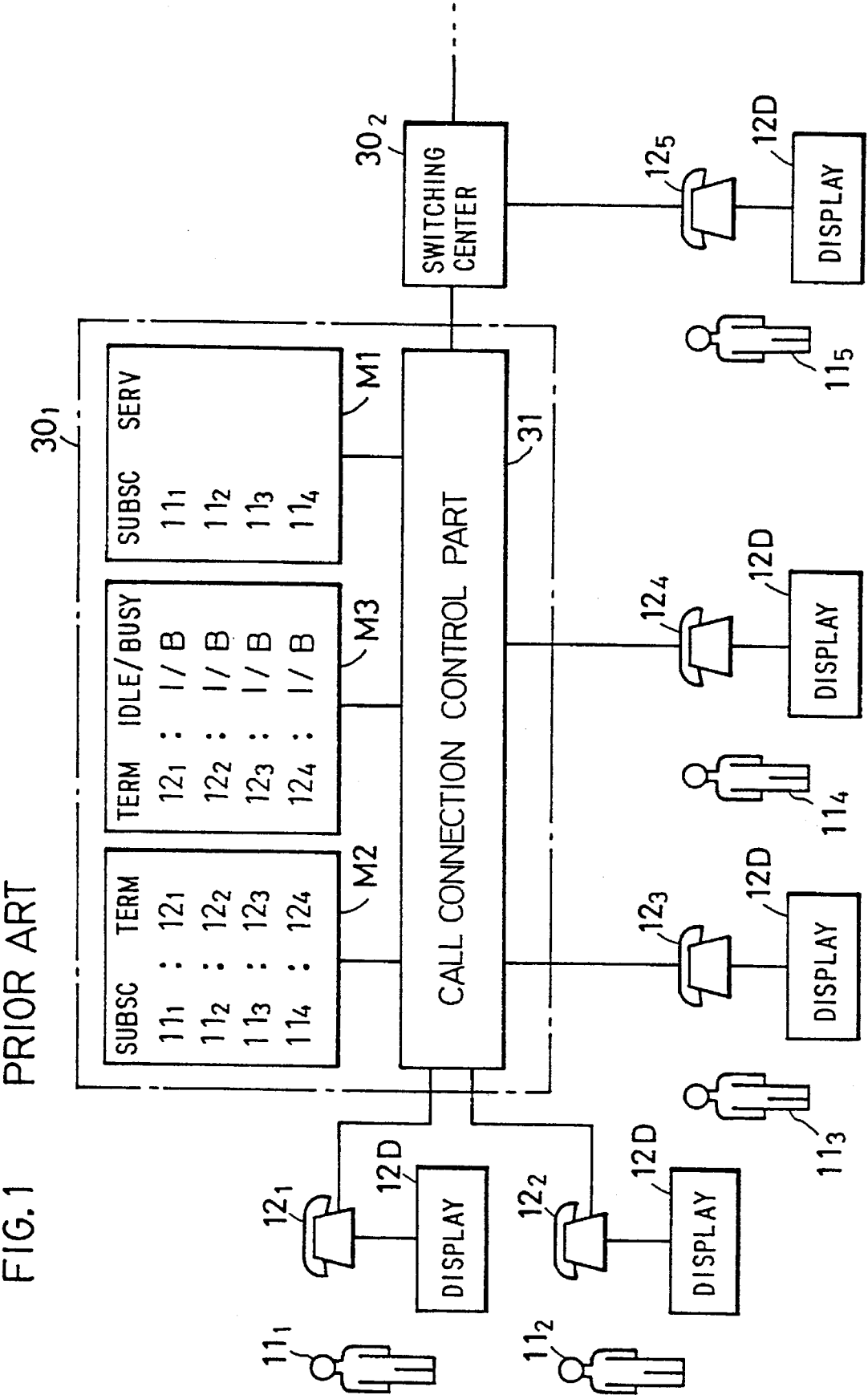
FIG. 1 is a block diagram showing a conventional communication system.
Figure 3:
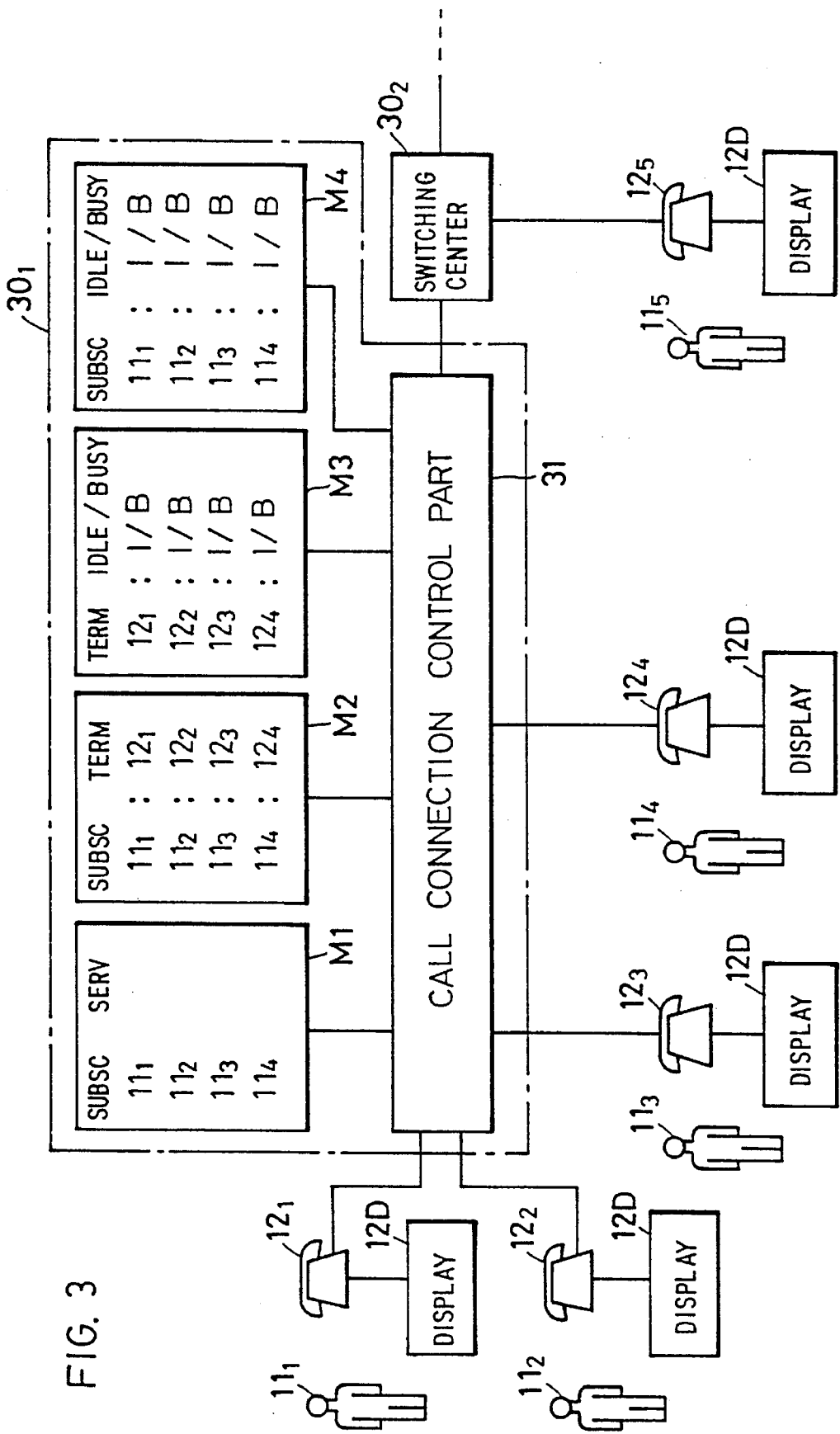
FIG. 3 is a block diagram showing an example of a personal communication system according to the present invention.
Figure 4:
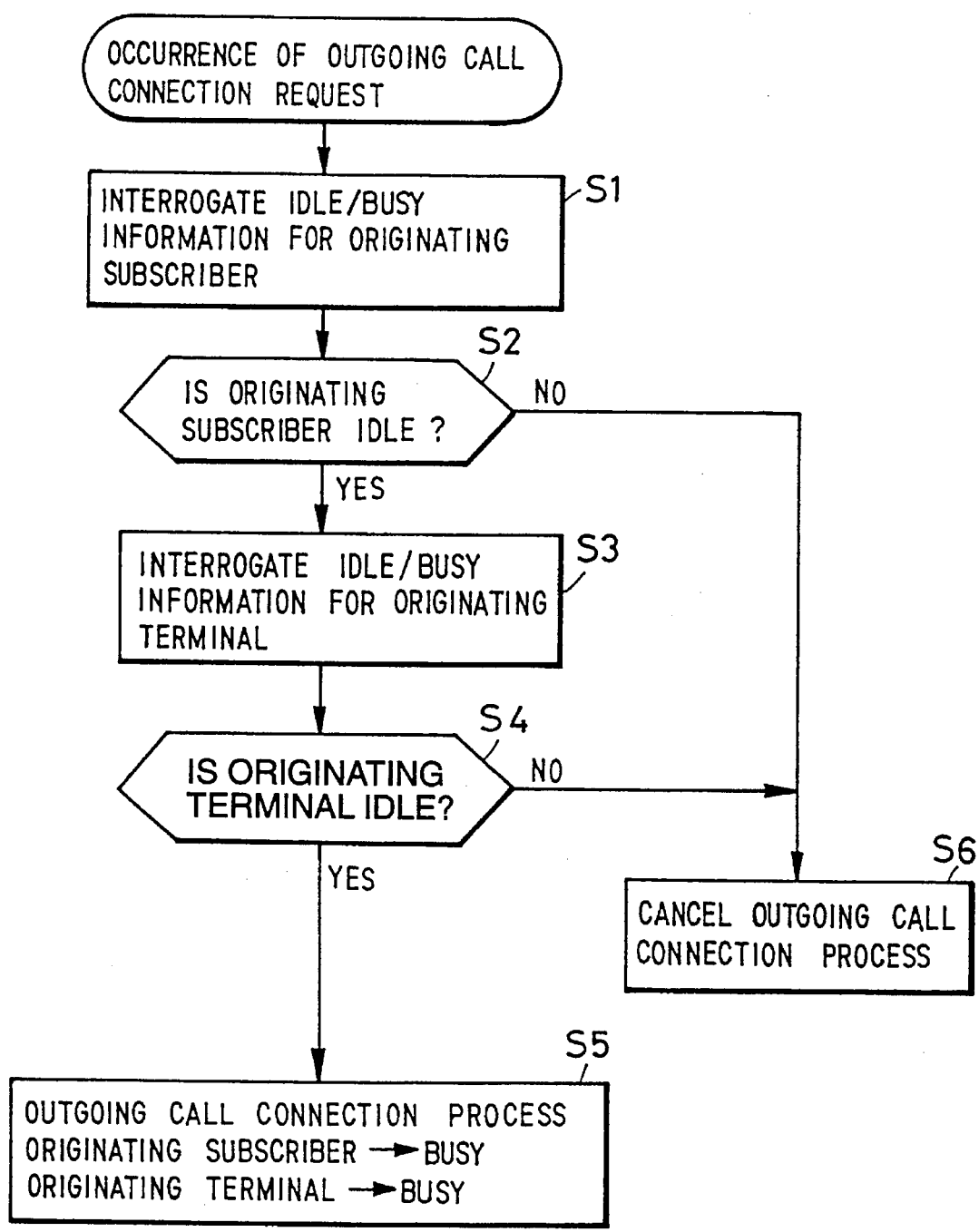
FIG. 4 is a flow chart showing an outgoing call connection process sequence performed by the system shown in FIG. 3.
Figure 5:
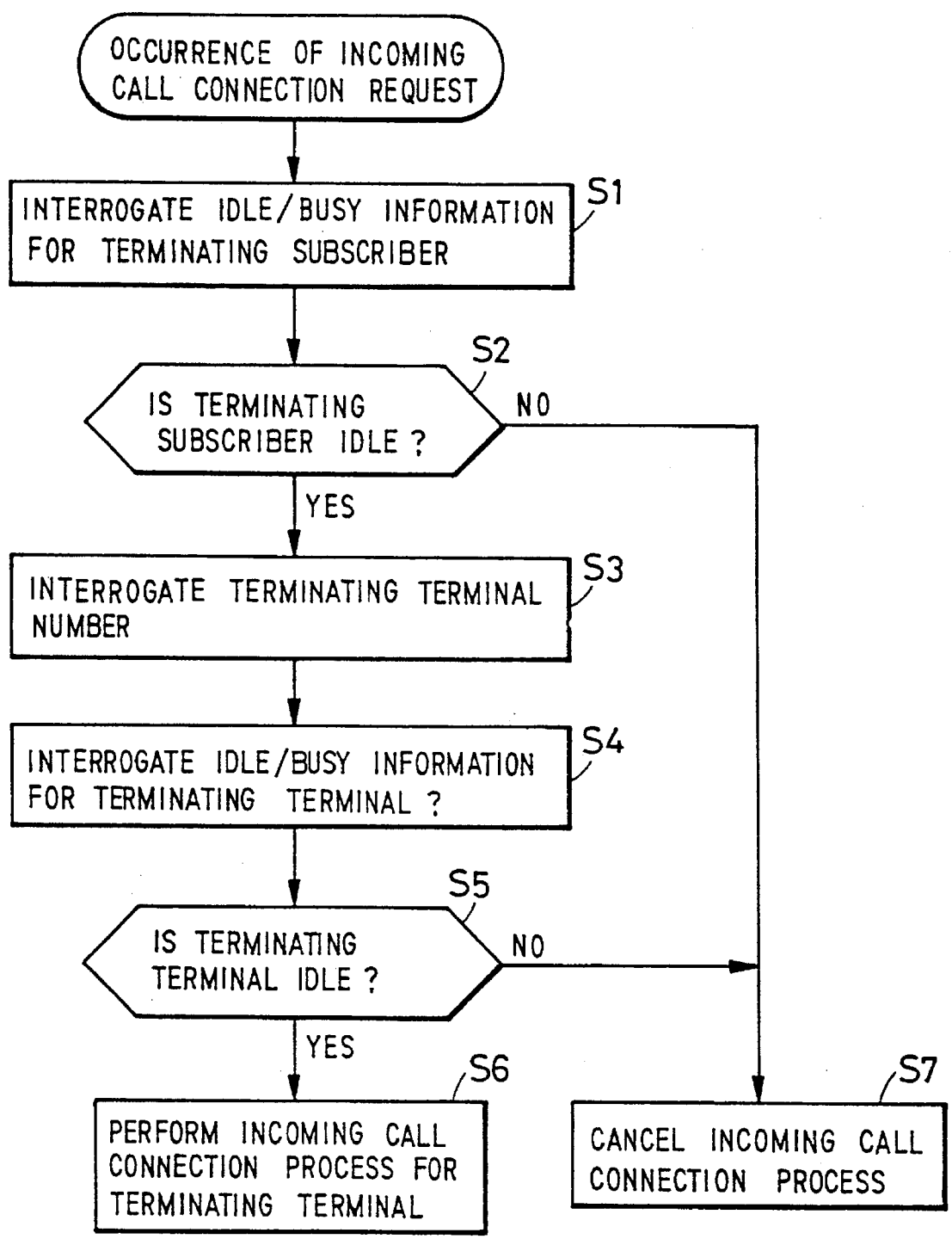
FIG. 5 is a flow chart showing an incoming call connection process sequence performed by the system shown in FIG. 3.

FIG. 3 shows an example of a personal communication system according to the present invention. For the sake of simplicity, portions corresponding to FIG. 1 are denoted by the same reference numerals. FIGS. 4 and 5 show examples of communication connection controlling sequences for an outgoing call and an incoming call, respectively, according to the present invention. According to the present invention, switching centers $30_1$, $30_2$, and so forth each comprise a subscriber service memory part M1, a terminating terminal memory part M2, a terminal idle/busy memory part M3, and a subscriber idle/busy memory part M4. The subscriber idle/busy memory part M4 stores idle/busy information corresponding to the personal number of each subscriber. Whenever a communication connection process is started, the corresponding terminal idle/busy information and the corresponding subscriber idle/busy information stored in the idle/busy memory parts M3 and M4 are set to busy state. In contrast, whenever the communication is finished, they are set to idle state. In FIG. 3, the same portions as those in FIG. 1 have the same functions.

In the personal communication, when a subscriber issues an outgoing call connection request, he dials his personal number and the personal number of a terminating subscriber so as to send them to a switching center. At this point, the terminal being used may automatically send its terminal number along with the originating personal number and the terminating personal number to the switching center as with a mobile station in a mobile communication system. Alternatively, the switching center may interrogate the terminal number from the line on which an outgoing call connection request takes place. In any case, when the switching center receives the outgoing call connection request, it can know from which terminal the outgoing call connection request is sent. Thus, the switching center can know the terminal number of the originating terminal. When a subscriber $11_1$ makes a call at a terminal $12_2$, he dials both his personal number $11_1$ and the personal number of a terminating subscriber (for example, $11_3$) so as to send an outgoing call connection request to the switching center $30_1$. When the switching center $30_1$ receives the outgoing call connection request, it interrogates a service class corresponding to the personal number of the originating subscriber from the subscriber service memory part M1. With the service class, the switching center $30_1$ starts an outgoing call connection process as shown in FIG. 4. The outgoing call connection process shown in FIG. 4 is based on a service class of a personal communication which does not include a call waiting service and a calling line identification service.

At step S1, the switching center $30_1$ refers to the idle/busy information for the subscriber $11_1$ stored in the subscriber idle/busy memory part M4. At step S2, the switching center $30_1$ determines whether or not the idle/busy information represents idle state. When the determined result at Step S2 is YES (namely, idle), the flow advances to step S3. At step S3, the switching center $30_1$ refers to the idle/busy information for a terminal $12_2$ stored in the terminal idle/busy memory part M3. At step S4, the switching center $30_1$ determines whether or not the idle/busy information represents idle state. When the determined result at step S4 is YES (idle), the flow advances to step S5. At step S5, the switching center $30_1$ interrogates a terminating terminal number $12_3$ of a terminating subscriber $11_3$ from the terminating terminal memory part M2 as in FIG. 1. In addition, the switching center $30_1$ performs an outgoing call connection process for the terminal $12_3$ and sets the idle/busy information for the subscriber $11_1$ and the terminal $12_2$ stored in the memory parts M4 and M3 to busy state. If the subscriber $11_1$ makes a call, while the terminal $12_1$ is receiving a call to him, the switching center $30_1$ determines that the idle/busy information for the subscriber $11_1$ is busy state at step S2. Thus, even if the terminal $12_2$ is idle, the switching center $30_1$ cancels the connection process against the outgoing call connection request from the subscriber $11_1$ at the terminal $12_2$ (at step S6). In addition, even if the switching center $30_1$ has determined that the subscriber $11_1$ is idle at step S2, when it has determined that the terminal $12_2$ is busy at step S4, it cancels the outgoing call connection process (at step S6).

When a call is terminated to the subscriber $11_1$, as shown in FIG. 5, the switching center $30_1$ refers to the idle/busy information for the subscriber $11_1$ stored in the subscriber idle/busy memory part M4 at step S1. At step S2, the switching center $30_1$ determines whether or not the idle/busy information is idle. When the determined result at step S2 is YES (namely, idle), the flow advances to step S3. At step S3, the switching center $30_1$ interrogates the terminal number of the terminating terminal $12_1$ of the subscriber $11_1$ stored in the terminating terminal memory part M2. At step S4, the switching center $30_1$ refers to the idle/busy information for the terminal $12_1$ stored in the terminal idle/busy memory part M3 at step S4. Thereafter, the flow advances to step S5. At step S5, the switching center $30_1$ determines whether or not the terminal $12_1$ is idle. When the determined result at step S5 is YES (namely, idle), the flow advances to Step S6. At step S6, the call connection control part 31 connects the call to the terminal $12_1$. However, when the call is terminated to the subscriber $11_1$ while he is communicating at for example the terminal $12_2$, the idle/busy information for the subscriber $11_1$ represents busy state, and therefore the flow advances from step S2 to step S7. At step S7, the switching center $30_1$ cancels the outgoing call connection process for the subscriber $11_1$. In addition, when the determined result at step S5 is NO (namely, busy), the switching center $30_1$ cancels the incoming call connection process for the subscriber $11_1$ (at step S7).

Figure 6:
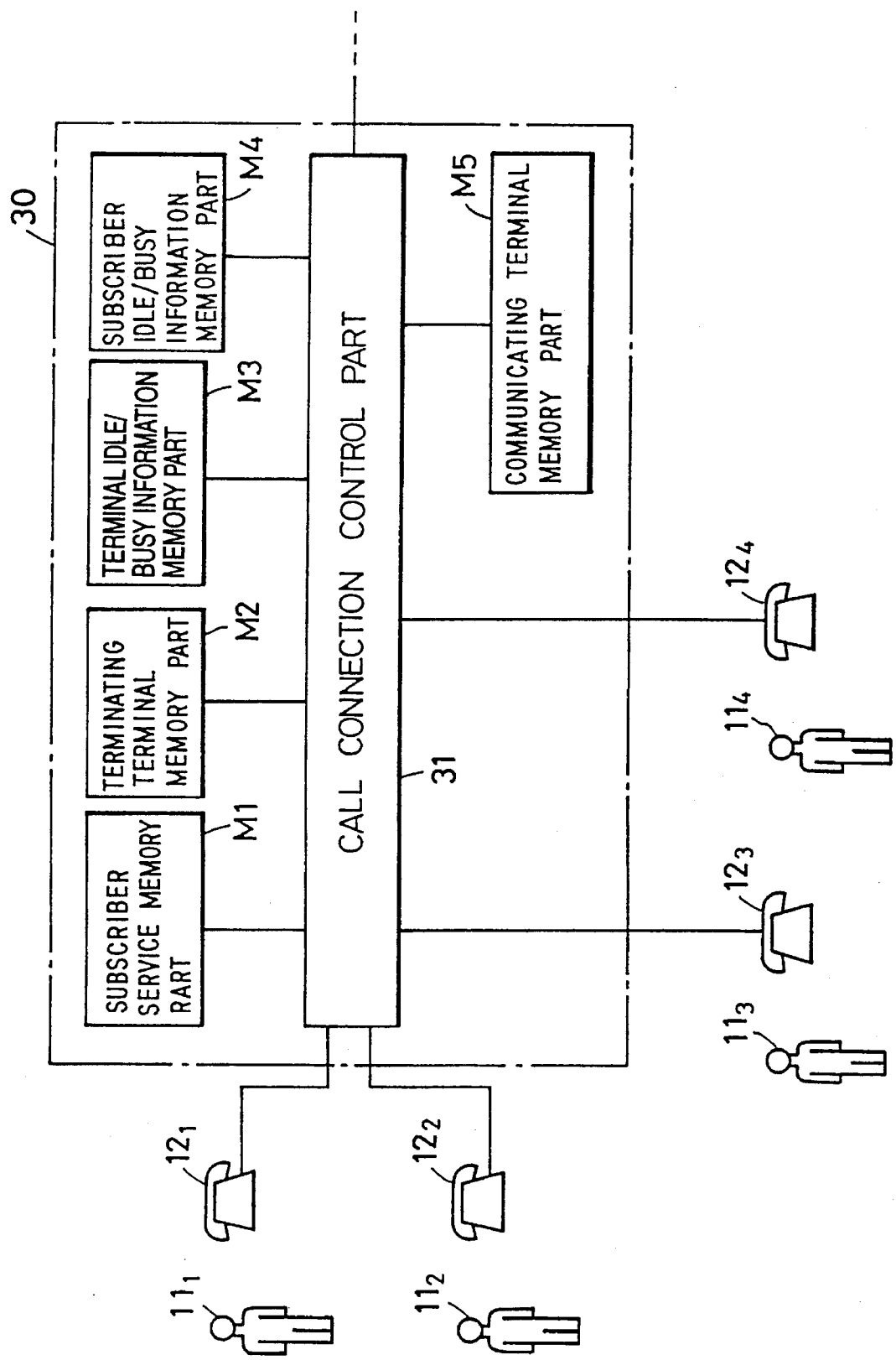
FIG. 6 is a block diagram showing the construction of a personal communication system which performs a call waiting service.
Figure 7:
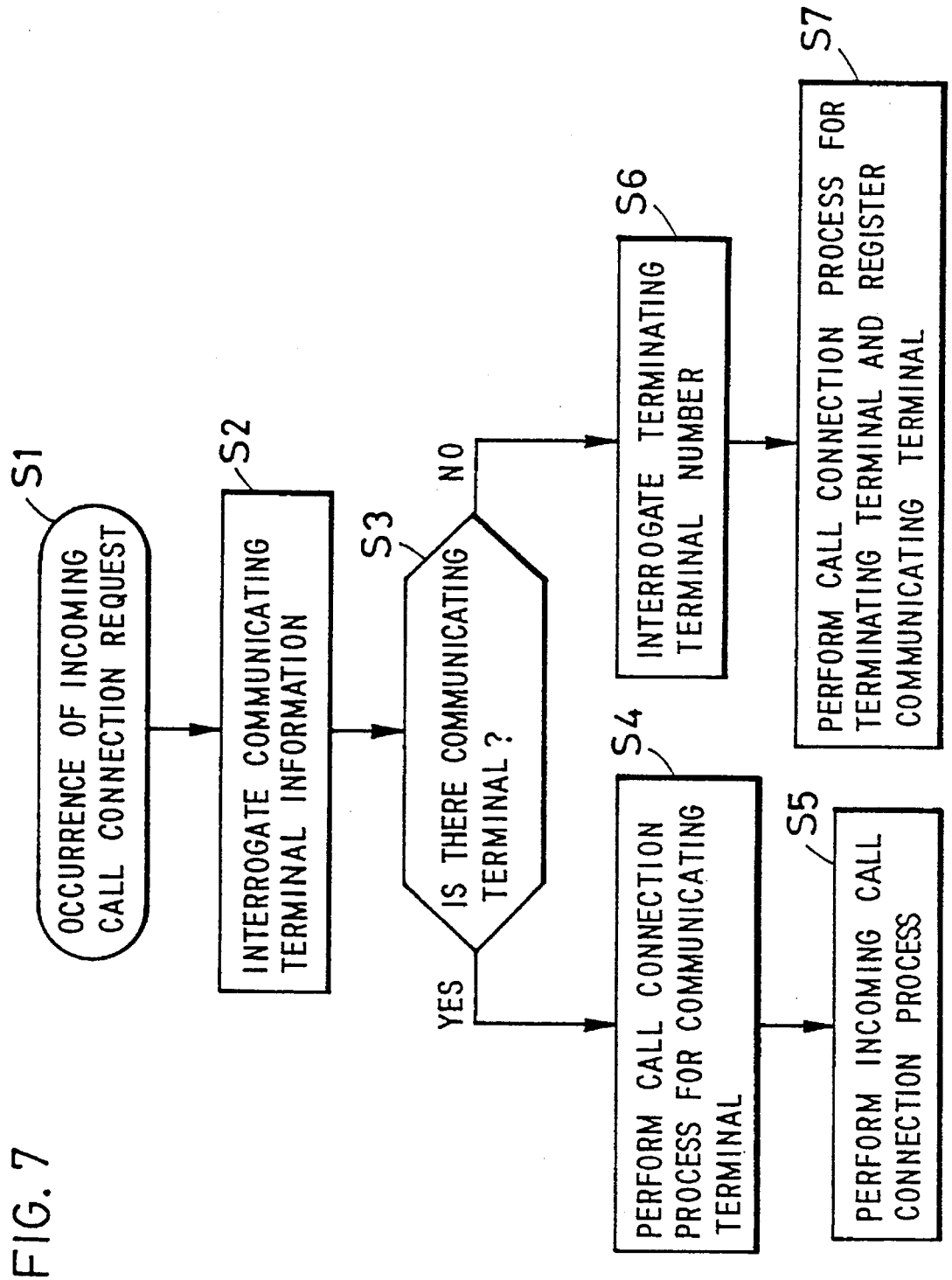
FIG. 7 is a flow chart showing a connection process sequence of the call waiting service.

FIG. 6 shows an example of the construction of a switching center 30 of a personal communication system which can provide a call waiting service. FIG. 7 shows an example of a connection process sequence of the call waiting service. In this embodiment, a switching center 30 comprises a subscriber service memory part M1, a terminating terminal memory part M2, a terminal idle/busy memory part M3, a subscriber idle/busy memory part M4, and a communicating terminal memory part M5. The memory parts M1 to M4 of FIG. 6 are the same as those of FIG. 3. The communicating terminal memory part M5 stores the terminal number of each terminal at which each subscriber is communicating. In FIG. 6, the same reference numerals as FIG. 3 have functions similar thereto.

First, a subscriber $11_1$ at a terminal $12_2$ dials both his personal number $11_1$ and the personal number $11_3$ of a terminating subscriber $11_3$. According to the same process sequence as FIG. 4, when a first communication is established between the subscribers $11_1$ and $11_3$, the switching center 30 registers the terminal number $12_2$ of the operating terminal $12_2$ corresponding to the personal number $11_1$ of the subscriber $11_1$ stored in the communicating terminal memory part M5.

Next, while the subscriber $11_1$ is communicating (as the first communication), if another subscriber $11_4$ issues a communication request to the subscriber $11_1$ from a terminal $12_4$ at step S1 of FIG. 7, the switching center 30 refers to the communicating terminal memory part M5 at step S2 and interrogates the communicating terminal information corresponding to the subscriber $11_1$. At step S3, the switching center 30 determines whether or not the subscriber $11_1$ is communicating. When the subscriber $11_1$ is communicating, the switching center 30 determines at which terminal the subscriber $11_1$ is communicating. In this example, since the terminal number $12_1$ of the terminal $12_1$ at which the subscriber $11_1$ is communicating is stored as communicating terminal information in the communicating terminal memory part M5, the switching center 30 causes the call connection control part 31 to connect a waiting call to the terminal $12_2$ at step S4. Thus, the subscriber $11_1$ who is communicating in the first communication knows that there is a new incoming call to him. When the subscriber $11_1$ issues an incoming call switching connection request to the switching center 30, it performs the incoming call switching connection process which switches the connection with the terminal $12_2$ to the connection with the terminal $12_4$ at step S5. Thus, a second communication from the subscriber $11_4$ to the subscriber $11_1$ is established. When the subscriber $11_1$ issues the incoming call switching connection request to the switching center 30, it restores the first communication for him.

When the communicating terminal number of the subscriber $11_1$ has not been stored in the communicating terminal memory part M5 at step S3 (namely, the determined result at step S3 is NO), the switching center 30 refers to the terminating terminal memory part M2 at step S6 and interrogates the terminal number $12_1$ of the terminating terminal 121 of the subscriber $11_1$. At step S7, the switching center 30 performs the incoming call connection process for the terminal $12_1$ at step S7. In addition, the switching center 30 registers the communicating terminal number $12_1$ corresponding to the subscriber $11_1$ of the communicating terminal memory part M5.

After step S5, even if the subscriber $11_1$ completes either the first communication or the second communication, the terminal number $12_2$ of the communicating terminal $12_2$ stored for the subscriber $11_1$ in the communicating terminal memory part M5 is not erased. When both communications are finished, the communicating terminal number $12_2$ is erased from the communicating terminal memory part M5.

Figure 8:
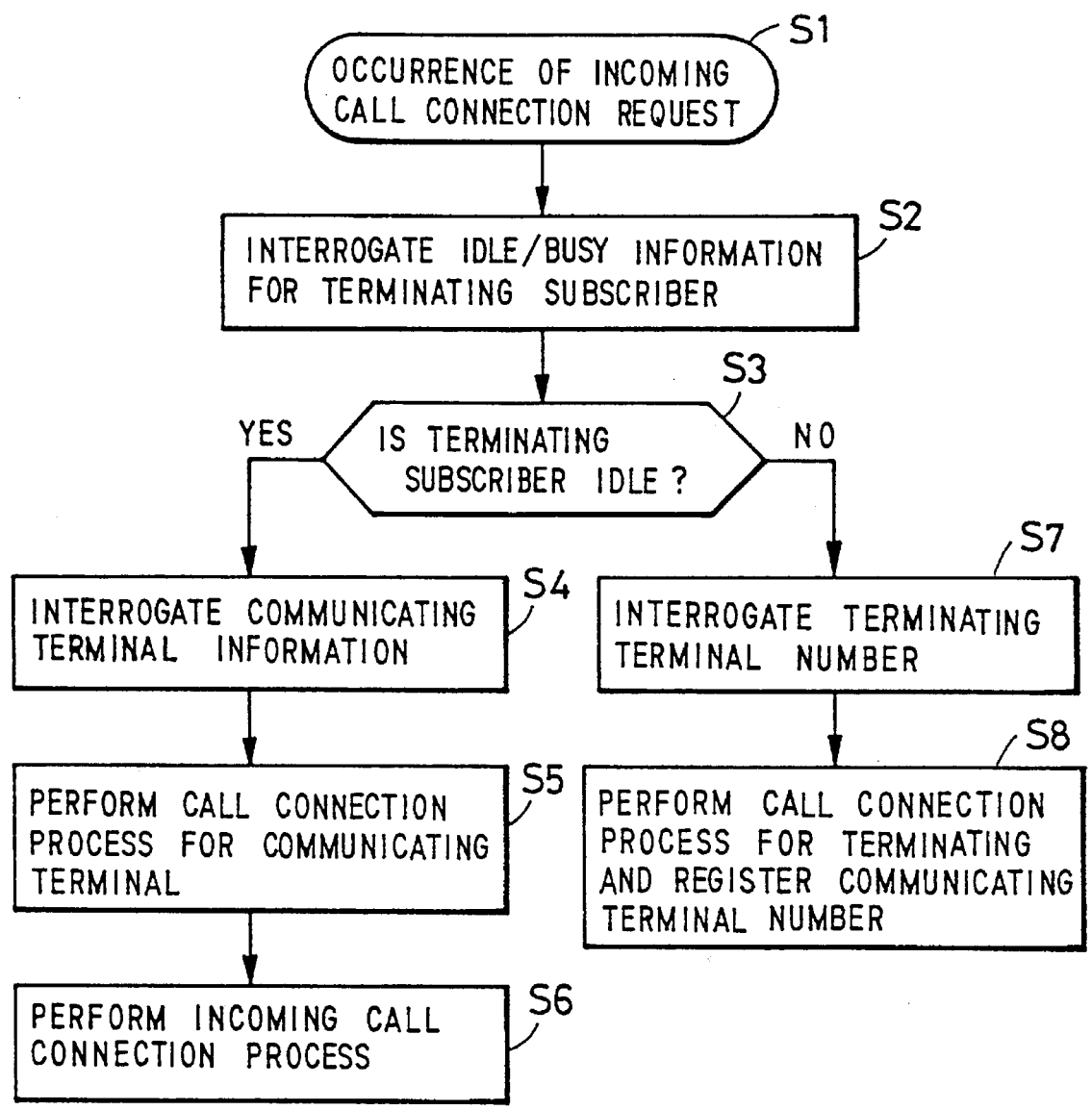
FIG. 8 is a flow chart showing a modification of the embodiment shown in FIG. 7.

FIG. 8 shows a modification of the above-described embodiment of FIG. 7 in which the process sequence of the call waiting service is modified such that, as with the embodiment shown in FIG. 5, the switching center refers to the subscriber idle/busy memory part M4 and determines whether or not a relevant terminating subscriber is communicating.

As with the above-described embodiments, assume that a subscriber $11_1$ who uses a terminal $12_2$ is communicating with a subscriber $11_3$ who uses a terminal $12_3$ (a first communication). In this situation, when a subscriber $11_4$ issues an incoming call connection request to the subscriber $11_1$ at step S1, the switching center 30 interrogates the idle/busy information for the terminating subscriber $11_1$ from the subscriber idle/busy information memory part M4 at step S2. At step S3, the switching center 30 determines whether or not the terminating subscriber $11_1$ is idle. In this example, since the subscriber $11_1$ is communicating with the subscriber $11_3$, the idle/busy information for the subscriber $11_1$ is busy. Thus, the flow advances to step S4. At step S4, the switching center 30 refers to the communicating terminal memory part M5 and interrogates the communicating terminal $12_2$ of the subscriber $11_1$. Thereafter, at step S5, when the switching center 30 receives an incoming call switching connection request from the subscriber $11_1$, it performs, at step S6, an incoming call switching connection process which switches the connection of the terminal $12_2$ to connection with the terminal $12_4$, thus establishing a second communication. When the subscriber $11_1$ does not have the first communication, since the switching center 30 has determined that the subscriber idle/busy information is idle at step S3, it interrogates the terminating terminal number $12_1$ of the terminating subscriber $11_1$ at step S7, and then at step S8, the switching center 30 performs the connection process for the terminating terminal $12_1$ and stores the communicating terminal number $12_1$ corresponding to the subscriber $11_1$ in the communicating terminal number memory part M5 in the same manner as described at steps S6 and S7 of FIG. 7.

Figure 2:
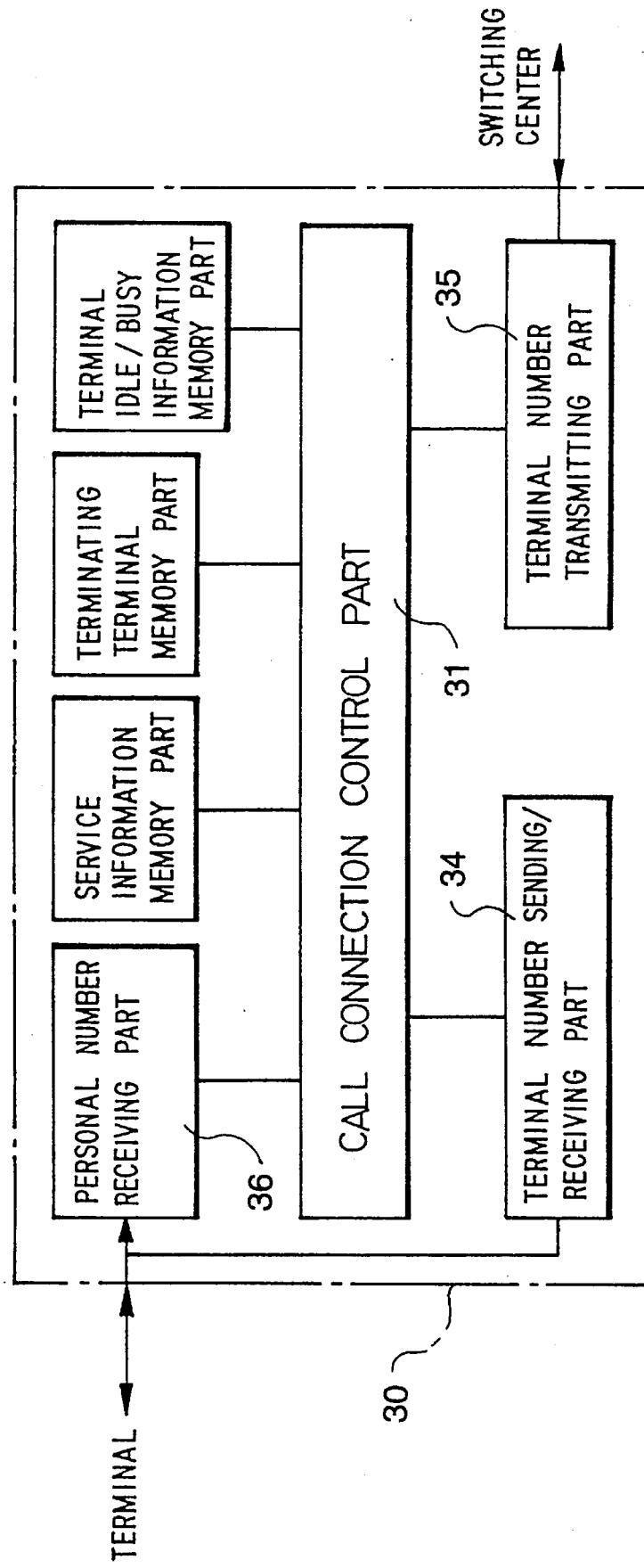
FIG. 2 is a block diagram showing the construction of a switching center which performs a calling line identification service of the system shown in FIG. 1.
Figure 9:
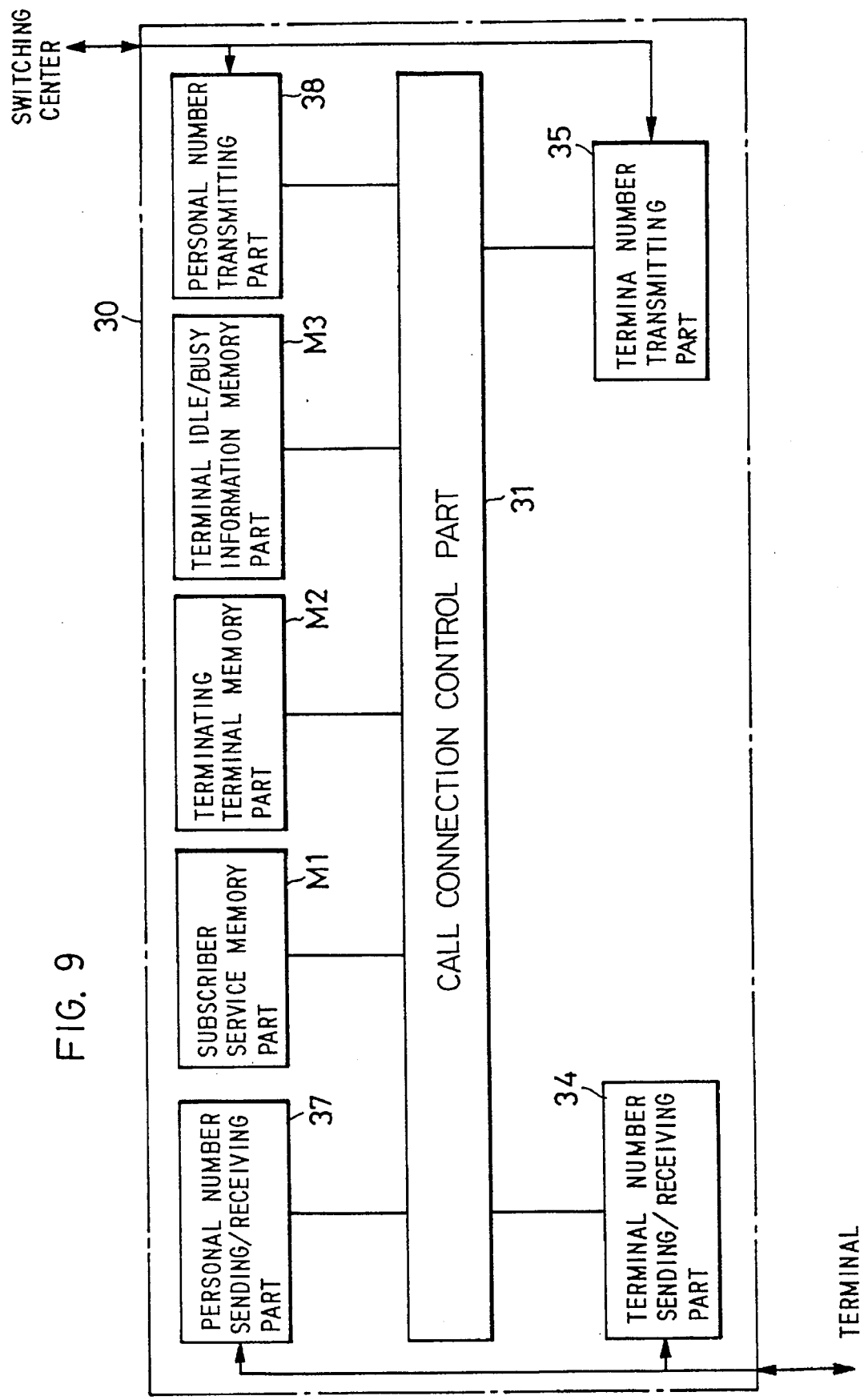
FIG. 9 is a block diagram showing the construction of a switching center which performs the calling line identification service.

FIG. 9 shows the construction of a switching center 30 which provides a service of identifying the personal number of an originating subscriber along with the originating terminal number identification service of the embodiment shown in FIG. 3. In FIG. 9, the switching center 30 comprises a call connection control part 31, a subscriber service memory part M1, a terminating terminal memory part M2, a terminal idle/busy information memory part M3, a terminal number sending/receiving part 34, a terminal number transmitting part 35, a personal number sending/receiving part 37, and a personal number transmitting part 38. The call connection control part 31, the subscriber service memory part M1, the terminating terminal memory part M2, the terminal idle/busy information memory part M3, and the terminal number sending/receiving part 34 of FIG. 9 are the same as those of FIG. 3. The terminal number sending/receiving part 34 and the terminal number transmitting part 35 of FIG. 9 are the same as those of FIG. 2. The personal number sending/receiving part 37 sends and receives a personal number to and from the terminal $12_j$. The personal number transmitting part 38 sends and receives a personal number between switching centers.

Figure 10:
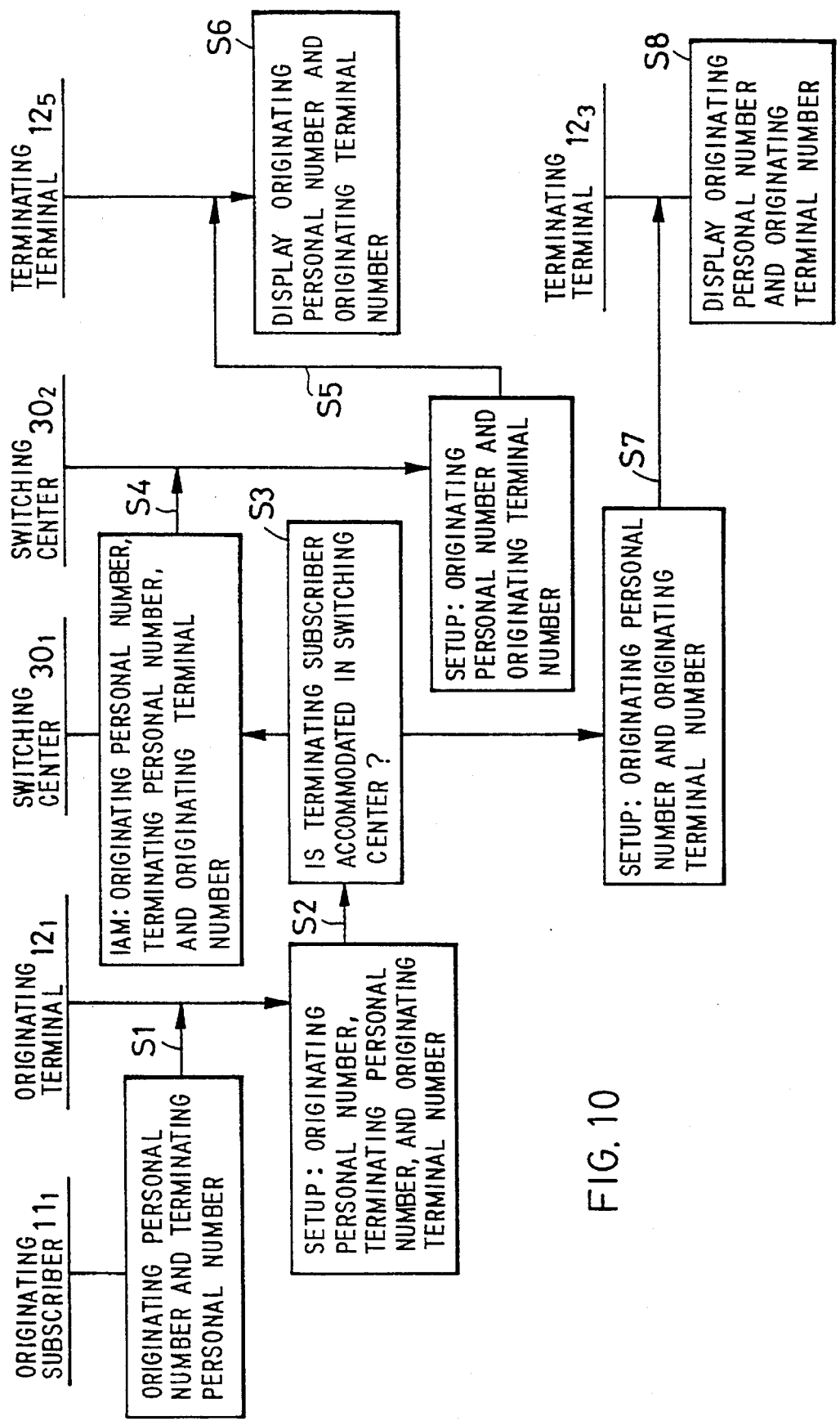
FIG. 10 is a flow chart showing a connection process sequence of the calling line identification service.

FIG. 10 shows a connection process sequence of the calling line identification service performed by the switching center 30 shown in FIG. 9. In the system shown in FIG. 3, when an originating subscriber $11_1$ makes a call to a subscriber $11_5$, he dials both his personal number $11_1$ and the personal number $11_5$ of a terminating subscriber $11_5$ at a terminal $12_1$ (at step S1). At this point, the terminal $12_1$ sends a SETUP message to the switching center $30_1$ (at step S2). The SETUP message serves to initiate a call and contains the terminating personal number $11_5$, the personal number $11_1$ of the originating subscriber $11_1$, and the terminal number $12_1$ of the originating terminal $12_1$.

The switching center $30_1$ receives the terminating personal number $11_5$, the personal number $11_1$ of the originating subscriber $11_1$, and the terminal number $12_1$ of the originating terminal $12_1$. The switching center $30_1$ determines whether or not the terminating personal number is accommodated therein (at step S3). When the terminating personal number is not accommodated, the switching center $30_1$ sends an IAM (initial address message) message to a terminating switching center $30_2$ which accommodates the terminating personal number (at step S4). The IAM message serves to transmit the outgoing call to the terminating switching center $30_2$ and contains the terminal number $12_1$ of the originating terminal $12_1$, the terminating personal number $11_5$, and the personal number $11_1$ of the originating subscriber $11_1$.

The terminating switching center $30_2$ interrogates the terminal number $12_5$ of the terminating terminal corresponding to the terminating subscriber $11_5$ from the terminating terminal memory part M2. Thereafter, with the terminal number $12_5$, the switching center $30_2$ interrogates the idle/busy information from the terminal idle/busy memory part M3. When the terminal $12_5$ is idle, the switching center $30_2$ sends a SETUP message to the terminating terminal $12_5$ (at step S5). The SETUP message serves to call the terminal $12_5$ and contains the terminal number $12_1$ of the terminating terminal $12_1$ and the personal number $11_1$ of the originating subscriber $11_1$.

The terminating terminal $12_5$ displays the terminal number $12_1$ of the originating terminal $12_1$ and the personal number $11_1$ of the originating subscriber $11_1$ (at step S6). Thus, the terminating subscriber $11_5$ can know the terminal number $12_1$ of the originating terminal $12_1$ and the personal number $11_1$ of the originating subscriber $11_1$. In this case, the terminating terminal $12_5$ may display only the personal number $11_1$ of the originating subscriber $11_1$. Thus, the terminating subscriber $11_5$ can guess who is the originating subscriber. In other words, when the originating terminal $12_1$ is installed in an office of a company and the terminal $12_1$ is shared by a plurality of subscribers, since the personal number of a subscriber which uses the terminal $12_1$ is displayed on the display 12D, the terminating subscriber can identify the originating subscriber.

In the above example, it was assumed that the terminal registered by the terminating subscriber $11_5$ as a terminating terminal was not accommodated in the switching center $30_1$. However, at steps S1 and S2, if the terminating subscriber is for example $11_3$, the switching center $30_1$ determines that the terminating terminal $12_3$ is accommodated therein at step 3. Thus, the flow advances from step S3 to step S7 of FIG. 10.

At step S7, the terminating center $30_1$ interrogates the terminal number $12_3$ of the terminating terminal corresponding to the terminating subscriber $11_3$ from the terminating terminal memory part M2 thereof. Thereafter, with the terminal number $12_3$, the switching center $30_1$ interrogates the idle/busy information from the terminal idle/busy memory part M3. When the terminal $12_3$ is idle, the switching center $30_1$ sends a SETUP message to the terminating terminal $12_3$. The SETUP message serves to call the terminal $12_3$ and contains the terminal number of the originating terminal $12_1$ and the personal number $11_1$ of the originating subscriber $11_1$.

At step S8, the terminating terminal $12_3$ displays the terminal number $12_1$ of the originating terminal $12_1$ and the personal number $11_1$ of the originating subscriber $11_1$ on the display 12D. Thus, the terminating subscriber $11_3$ can know these numbers through the display 12D.

The above-described embodiments may be applied for personal communications in a mobile communication network as well as for those in the conventional telephone network. FIG. 11 shows an example of the mobile communication system according to the present invention. To effect mobile communication, car telephones, portable cellular phones, and so forth may be used. In this example, mobile communication using car telephones will be described. In FIG. 11, reference numerals $12M_1$, $12M_2$, and so forth function as terminals for use in the above-described personal communications. The mobile stations $12M_1$, $12M_2$, and so forth can communicate with their nearest base stations $40_1$, $40_2$, and so forth through radio channels. The base stations $40_1$, $40_2$, and so forth are linked to switching centers $30_1$, $30_2$, and so forth. The present locations of the mobile stations $12M_1$, $12M_2$, and so forth are always supervised by the switching centers $30_1$, $30_2$, . . . and stored in location memories (not shown) thereof. Thus, each subscriber can make a call from his mobile station as an originating terminal to any terminating terminal which may be a mobile station or a fixed terminal (not shown). In addition, any mobile station as a terminating terminal can receive an incoming call from any terminal. When a subscriber uses a particular mobile station as a personal communication terminal, provided that the station number of the mobile station as a terminating terminal is registered to the switching center, he can have various classes of personal communication services according to the connection process sequence of the present invention.

As described above, according to the first aspect of the present invention, the switching center refers to the idle/busy information for the subscriber stored in the subscriber idle/busy memory part M4. While the subscriber is communicating at a particular terminal and is performing an incoming/outgoing call connection process, the switching center can restrict the incoming/outgoing call connection process for this subscriber against another terminal.

According to the second aspect of the present invention, the switching center stores the terminal number of a communicating terminal of each subscriber. With the communicating terminal number, the switching center performs a call waiting process for the subscriber. Thus, even if a second communication request takes place for a subscriber who is communicating at a terminal other than his terminating terminal, the switching center can perform an incoming call connection process for the terminal at which the subscriber is actually communicating rather than performing a useless incoming call connection process for a terminal that the subscriber is not using at the time. Thus, the subscriber can securely have a call waiting service at any terminal.

In addition, according to the third aspect of the present invention, when an originating subscriber makes a call with his personal number, an originating switching center transmits the call to a terminating switching center along with the personal number of the originating subscriber. The terminating switching center transmits the personal number of the originating subscriber to a terminating terminal. Thus, the terminating terminal can display the personal number of the originating subscriber.

In the above-described embodiments, the switching center 30 comprises the terminating terminal memory part M2, the terminal idle/busy memory part M3, the subscriber idle/busy memory part M4, and the communicating terminal memory part M5. However, these memory parts may be replaced by a database or the like. When the switching center interrogates required data from the database, the same effect may be accomplished. Although the terminating terminal memory part M2 and the subscriber idle/busy memory part M4 were independently provided according to the embodiment shown in FIG. 3, both the terminating terminal number and the idle/busy information thereof may be registered in one memory part using the personal number of each subscriber as a common address therefor. In this construction, when the personal number of each subscriber is interrogated from the memory part, both the idle/busy information and the terminating terminal number thereof may be obtained. Likewise, in the embodiment shown in FIG. 6, the terminating terminal number, the idle/busy information, and the communicating terminal number can be registered at the same address corresponding to the personal number of each subscriber in one memory part instead of the individual memory parts M2, M4, and M5. In addition, this construction may apply to the embodiment shown in FIG. 9.

What is claimed is:

1. A call connection method in a personal communication system, said personal communication system including a plurality of switching centers, each of said plurality of switching centers comprising: a plurality of terminals; a plurality of subscribers each having a personal number unique thereto; terminal number sending/receiving means for sending and receiving terminal numbers to and from said plurality of terminals; personal number sending/receiving means for sending and receiving personal numbers to and from said plurality of terminals; terminal number transmitting means for sending and receiving to and from another switching center the terminal number of an originating terminal used by an originating subscriber to issue an outgoing call and the terminal number of a terminating terminal; personal number transmitting means for sending and receiving a personal number of an originating subscriber to and from another switching center; and terminal idle/busy memory means for storing terminal idle/busy information in correspondence with the terminal number of each terminal, said call connection method comprising, when any one of the subscribers accommodated within one switching center performs a personal communication with any one of the subscribers accommodated within another switching center by using any one of the terminals accommodated within said one switching center, the steps of:

(A) performing an originating process by which an originating subscriber within said one switching center inputs the personal number of said originating subscriber and the terminal number of a terminating subscriber within said another switching center by using any one of the terminals within said one switching center as an originating terminal;

(B) at the originating terminal, sending the personal number of the originating subscriber and the terminal number of the terminating subscriber together with the terminal number of the originating terminal from said originating terminal to said one switching center;

(C) at said one switching center, receiving the personal number of the originating subscriber by use of the personal number sending/receiving means within said one switching center, and concurrently receiving both the terminal numbers of the originating terminal and the terminating subscriber by use of the terminal number sending/receiving means within said one switching center;

(D) at said one switching center, transmitting the personal number of the originating subscriber from said one switching center to said another switching center by use of the personal number transmitting means within said one switching center, and concurrently transmitting both the terminal numbers of the originating terminal and the terminating subscriber from said one switching center to said another switching center by use of the terminal number transmitting means within said one switching center; and (E) at said another switching center, receiving the personal number of the originating subscriber by use of the personal number transmitting means within said another switching center, and concurrently receiving both the terminal numbers of the originating terminal and the terminating subscriber by use of the terminal number transmitting means within said another switching center, and when the terminating terminal corresponding to the received terminal number of the terminating subscriber is not busy as a result of retrieval of the terminal idle/busy memory means within said another switching center, calling the terminating terminal by use of the terminal number sending/receiving means within said another switching center and sending the received personal number of the originating subscriber and the received terminal number of the originating terminal by use of the personal number sending/receiving means and the terminal number sending/receiving means within said another switching center, respectively.

2. The method as set forth in claim 1, further including the step of:

(F) at the called terminating terminal, displaying both the personal number of the originating subscriber and the terminal number of the originating terminal on display means of said called terminating terminal.

3. A call connection method in a personal communication system, said personal communication system including a plurality of switching centers, each of said plurality of switching centers comprising: a plurality of terminals; a plurality of subscribers each having a personal number unique thereto; terminal number sending/receiving means for sending and receiving terminal numbers to and from said plurality of terminals; personal number sending/receiving means for sending and receiving personal numbers to and from said plurality of terminals; terminal number transmitting means for sending and receiving to and from another switching center the terminal number of an originating terminal used by an originating subscriber to issue an outgoing call and the terminal number of a terminating terminal; personal number transmitting means for sending and receiving a personal number of an originating subscriber to and from another switching center; and terminal idle/busy memory means for storing terminal idle/busy information in correspondence with the terminal number of each terminal, said call connection method comprising, when any one of the subscribers accommodated within one switching center performs a personal communication with any one of the subscribers accommodated within another switching center by using any one of the terminals accommodated within said one switching center, the steps of:

(A) performing an originating process by which an originating subscriber within said one switching center inputs the personal number of said originating subscriber and the terminal number of a terminating subscriber within said another switching center by using any one of the terminals within said one switching center as an originating terminal;

(B) at the originating terminal, sending the personal number of the originating subscriber and the terminal number of the terminating subscriber from said originating terminal to said one switching center;

(C) at said one switching center, receiving the personal number of the originating subscriber from the originating terminal by use of the personal number sending/receiving means within said one switching center, and concurrently receiving the terminal number of the terminating subscriber from the originating terminal by use of the terminal number sending/receiving means within said one switching center, and retrieving the terminal number of the originating terminal;

(D) at said one switching center, transmitting the personal number of the originating subscriber from said one switching center to said another switching center by use of the personal number transmitting means within said one switching center, and concurrently transmitting both the terminal numbers of the originating terminal and of the terminating subscriber from said one switching center to said another switching center by use of the terminal number transmitting means within said one switching center; and (E) at said another switching center, receiving the personal number of the originating subscriber by use of the personal number transmitting means within said another switching center, and concurrently receiving both the terminal numbers of the originating terminal and of the terminating subscriber by use of the terminal number transmitting means within said another switching center, and when the terminating terminal corresponding to the received terminal number of the terminating subscriber is not busy as a result of retrieval of the terminal idle/busy memory means within said another switching center, calling the terminating terminal by use of the terminal number sending/receiving means within said another switching center and sending the received personal number of the originating subscriber and the received terminal number of the originating terminal by use of the personal number sending/receiving means and the terminal number sending/receiving means within said another switching center, respectively.

4. The method as set forth in claim 3, further including the step of:

(F) at the called terminating terminal, displaying both the personal number of the originating subscriber and the terminal number of the originating terminal on display means of said called terminating terminal.

5. A call connection method in a personal communication system, said personal communication system including a plurality of switching centers, each of said plurality of switching centers comprising: a plurality of terminals; a plurality of subscribers each having a personal number unique thereto; terminal number sending/receiving means for sending and receiving terminal numbers to and from said plurality of terminals; personal number sending/receiving means for sending and receiving personal numbers to and from said plurality of terminals; terminal number transmitting means for sending and receiving to and from another switching center the terminal number of an originating terminal used by an originating subscriber to issue an outgoing call and the terminal number of a terminating terminal; personal number transmitting means for sending and receiving a personal number of an originating subscriber to and from another switching center; and terminal idle/busy memory means for storing terminal idle/busy information in correspondence with the terminal number of each terminal, said call connection method comprising, when any one of the subscribers accommodated within one switching center performs a personal communication with any one of the subscribers accommodated within another switching center by using any one of the terminals accommodated within said one switching center, the steps of:

(A) performing an originating process by which an originating subscriber within said one switching center inputs the personal number of said originating subscriber and both the terminal number and the personal number of a terminating subscriber within said another switching center by using any one of the terminals within said one switching center as an originating terminal;

(B) at the originating terminal, sending both the personal numbers of the originating subscriber and of the terminating subscriber and concurrently sending the terminal number of the terminating subscriber together with the terminal number of the originating terminal from said originating terminal to said one switching center;

(C) at said one switching center, receiving both the personal numbers of the originating subscriber and of the terminating subscriber from the originating terminal by use of the personal number sending/receiving means within said one switching center, and concurrently receiving both the terminal numbers of the originating terminal and of the terminating subscriber from the originating terminal by use of the terminal number sending/receiving means within said one switching center;

(D) at said one switching center, transmitting the personal number of the originating subscriber from said one switching center to said another switching center by use of the personal number transmitting means within said one switching center, and concurrently transmitting both the terminal numbers of the originating terminal and of the terminating subscriber from said one switching center to said another switching center by use of the terminal number transmitting means within said one switching center; and (E) at said another switching center, receiving the personal number of the originating subscriber by use of the personal number transmitting means within said another switching center, and concurrently receiving both the terminal numbers of the originating terminal and of the terminating subscriber by use of the terminal number transmitting means within said another switching center, and when the terminating terminal corresponding to the received terminal number of the terminating subscriber is not busy as a result of retrieval of the terminal idle/busy memory means within said another switching center, calling the terminating terminal by use of the terminal number sending/receiving means within said another switching center and sending the received personal number of the originating subscriber and the received terminal number of the originating terminal by use of the personal number sending/receiving means and the terminal number sending/receiving means within said another switching center, respectively.

6. The method as set forth in claim 5, further including the step of:

(F) at the called terminating terminal, displaying both the personal number of the originating subscriber and the terminal number of the originating terminal on display means of said called terminating terminal.

7. A call connection method in a personal communication system, said personal communication system including a plurality of switching centers and a database which is accessed by each switching center to read out required data thereof, each of said plurality of switching centers comprising: a plurality of terminals; a plurality of subscribers each having a personal number unique thereto; terminal number sending/receiving means for sending and receiving terminal numbers to and from said plurality of terminals; personal number sending/receiving means for sending and receiving personal numbers to and from said plurality of terminals; terminal number transmitting means for sending and receiving to and from another switching center the terminal number of an originating terminal used by an originating subscriber to issue an outgoing call and the terminal number of a terminating terminal; and personal number transmitting means for sending and receiving a personal number of an originating subscriber to and from another switching center, said database comprising terminal idle/busy memory means for storing terminal idle/busy memory means for storing terminal idle/busy information in correspondence with the terminal number of each terminal within all the switching centers and terminating terminal memory means for storing the terminal number of a terminating terminal in correspondence with the personal number of each subscriber within all the switching centers, said terminal number of the terminating terminal having been registered by each subscriber as his or her terminating terminal to which an incoming call for him or her should be connected, said call connection method comprising, when any one of the subscribers accommodated within one switching center performs a personal communication with any one of the subscribers accommodated within another switching center by using any one of the terminals accommodated within said one switching center, the steps of:

(A) performing an originating process by which an originating subscriber within said one switching center inputs the personal number of said originating subscriber and the personal number of a terminating subscriber within said another switching center by using any one of the terminals within said one switching center as an originating terminal;

(B) at the originating terminal, sending both the personal numbers of the originating subscriber and of the terminating subscriber from said originating terminal to said one switching center;

(C) at said one switching center, receiving both the personal numbers of the originating subscriber and of the terminating subscriber from the originating terminal by use of the personal number sending/receiving means within said one switching center, and accessing the database using the received personal number of the terminating subscriber to read out the terminal number of the terminating terminal;

(D) at said one switching center, transmitting the personal number of the originating subscriber from said one switching center to said another switching center by use of the personal number transmitting means within said one switching center, and concurrently transmitting both the terminal numbers of the originating terminal and of the terminating subscriber from said one switching center to said another switching center by use of the terminal number transmitting means within said one switching center;

(E) at said another switching center, receiving the personal number of the originating subscriber by use of the personal number transmitting means within said another switching center, and concurrently receiving both the terminal numbers of the originating terminal and of the terminating subscriber by use of the terminal number transmitting means within said another switching center, and when the terminating terminal corresponding to the received terminal number of the terminating subscriber is not busy as a result of access of the database, calling the terminating terminal by use of the terminal number sending/receiving means within said another switching center and sending the received personal number of the originating subscriber and the received terminal number of the originating terminal by use of the personal number sending/receiving means and the terminal number sending/receiving means within said another switching center, respectively.

8. The method as set forth in claim 7, further including the step of:

(F) at the called terminating terminal, displaying both the personal number of the originating subscriber and the terminal number of the originating terminal on display means of said called terminating terminal.

9. A call connection method in a personal communication system, said personal communication system including a plurality of switching centers and a database which is accessed by each switching center to read out required data thereof, each of said plurality of switching centers comprising: a plurality of terminals; a plurality of subscribers each having a personal number unique thereto; terminal number sending/receiving means for sending and receiving terminal numbers to and from said plurality of terminals; personal number sending/receiving means for sending and receiving personal numbers to and from said plurality of terminals; terminal number transmitting means for sending and receiving to and from another switching center the terminal number of an originating terminal used by an originating subscriber to issue an outgoing call and the terminal number of a terminating terminal; and personal number transmitting means for sending and receiving a personal number of an originating subscriber to and from another switching center, said database comprising terminal idle/busy memory means for storing terminal idle/busy information in correspondence with the terminal number of each terminal within all the switching centers and terminating terminal memory means for storing the terminal number of a terminating terminal in correspondence with the personal number of each subscriber within all the switching centers, said terminal number of the terminating terminal having been registered by each subscriber as his or her terminating terminal to which an incoming call for him or her should be connected, said call connection method comprising, when any one of the subscribers accommodated within one switching center performs a personal communication with any one of the subscribers accommodated within another switching center by using any one of the terminals accommodated within said one switching center, the steps of:

(A) performing an originating process by which an originating subscriber within said one switching center inputs the personal number of said originating subscriber and the terminal number of a terminating subscriber within said another switching center by using any one of the terminals within said one switching center as an originating terminal;

(B) at the originating terminal, sending the personal number of the originating subscriber and the terminal number of the terminating subscriber form said originating terminal to said one switching center;

(C) at said one switching center, receiving the personal number of the originating subscriber from the originating terminal by use of the personal number sending/receiving means within said one switching center, and concurrently receiving the terminal number of the terminating subscriber from the originating terminal by use of the terminal number sending/receiving means within said one switching center, and retrieving the terminal number of the originating terminal;

(D) at said one switching center, transmitting the personal number of the originating subscriber from said one switching center to said another switching center by use of the personal number transmitting means within said one switching center, and concurrently transmitting both the terminal numbers of the originating terminal and of the terminating subscriber from said one switching center to said another switching center by use of the terminal number transmitting means within said one switching center;

(E) at said another switching center, receiving the personal number of the originating subscriber by use of the personal number transmitting means within said another switching center, and concurrently receiving both the terminal numbers of the originating terminal and of the terminating subscriber by use of the terminal number transmitting means within said another switching center, and when the terminating terminal corresponding to the received terminal number of the terminating subscriber is not busy as a result of access of the database, calling the terminating terminal by use of the terminal number sending/receiving means within said another switching center and sending the received personal number of the originating subscriber and the received terminal number of the originating terminal by use of the personal number sending/receiving means and the terminal number sending/receiving means within said another switching center, respectively.

10. The method as set forth in claim 9, further including the step of:

(F) at the called terminating terminal, displaying both the personal number of the originating subscriber and the terminal number of the originating terminal on display means of said called terminating terminal.

* * * * *